United States Patent [19]

Miklos

[11] Patent Number: 4,798,021
[45] Date of Patent: Jan. 17, 1989

[54] AUTOMATIC HORIZONTAL JIGGING DOWNRIGGER

[76] Inventor: Louis F. Miklos, Box 500, East Chicago, Ind. 46312

[21] Appl. No.: 68,119

[22] Filed: Jun. 29, 1987

[51] Int. Cl.$^4$ .............................................. A01K 91/00
[52] U.S. Cl. ...................................... 43/19.2; 43/26.1; 43/43.13
[58] Field of Search .................... 43/19.2, 26.1, 26.2, 43/27.4, 43.12, 43.13

[56] References Cited

U.S. PATENT DOCUMENTS

| | | | |
|---|---|---|---|
| 2,521,852 | 9/1950 | Jones | 43/43.13 |
| 2,596,269 | 5/1952 | Metzger | 43/43.13 |
| 3,835,573 | 9/1974 | Borchardt | 43/43.12 |
| 3,908,300 | 9/1975 | Kuismi | 43/43.13 |
| 4,204,356 | 5/1980 | Smith | 43/27.4 |
| 4,486,970 | 12/1984 | Larson | 43/43.13 |
| 4,509,287 | 4/1985 | Hood | 43/26.1 |
| 4,638,585 | 1/1987 | Korte | 43/26.1 |

*Primary Examiner*—Kurt Rowan
*Attorney, Agent, or Firm*—Richard G. Kinney

[57] ABSTRACT

A versatile and adaptable streamlined downrigger which, when pulled through water behind a boat, automatically and horizontally jigs a releasably-attached fishing line. The downrigger has a jigging line which is reeled in and pulled out of its housing. At the free end of this line is a finned release device which releasably captivates a fishing line. The fishing line is released upon striking of a fish. The housing has a set of fins which bias the downrigger's "swimming" position (left, right, or directly behind) relative to the point of attachment to the boat. This allows a number of downriggers to be used behind a small boat without the tangling of fishing or towing lines. The housing also mounts a propeller whose blades have fish-attractant prismatic reflective surfaces. Movement of the downrigger through the water causes the propeller to turn and to "flash" attractively. Means are provided for automatically and repeatedly coupling and decoupling the propeller to a reel for the jigging line, so as to alternatively reel in and allow the line to feed out. These means include a snap action lever arm which is pivoted (by actuators attached to separate points of the jigging line) between two home positions, to which it is spring biased to avoid "hang up" at an intermediate position. The housing includes a compartment which can be filled fully or partly with air or water or heavy materials to change the buoyancy and thus change the underwater movement of the downrigger. The unit is easily disassembled to allow the substitution of different propellers with different-colored or types of prismatic reflectors.

8 Claims, 6 Drawing Sheets

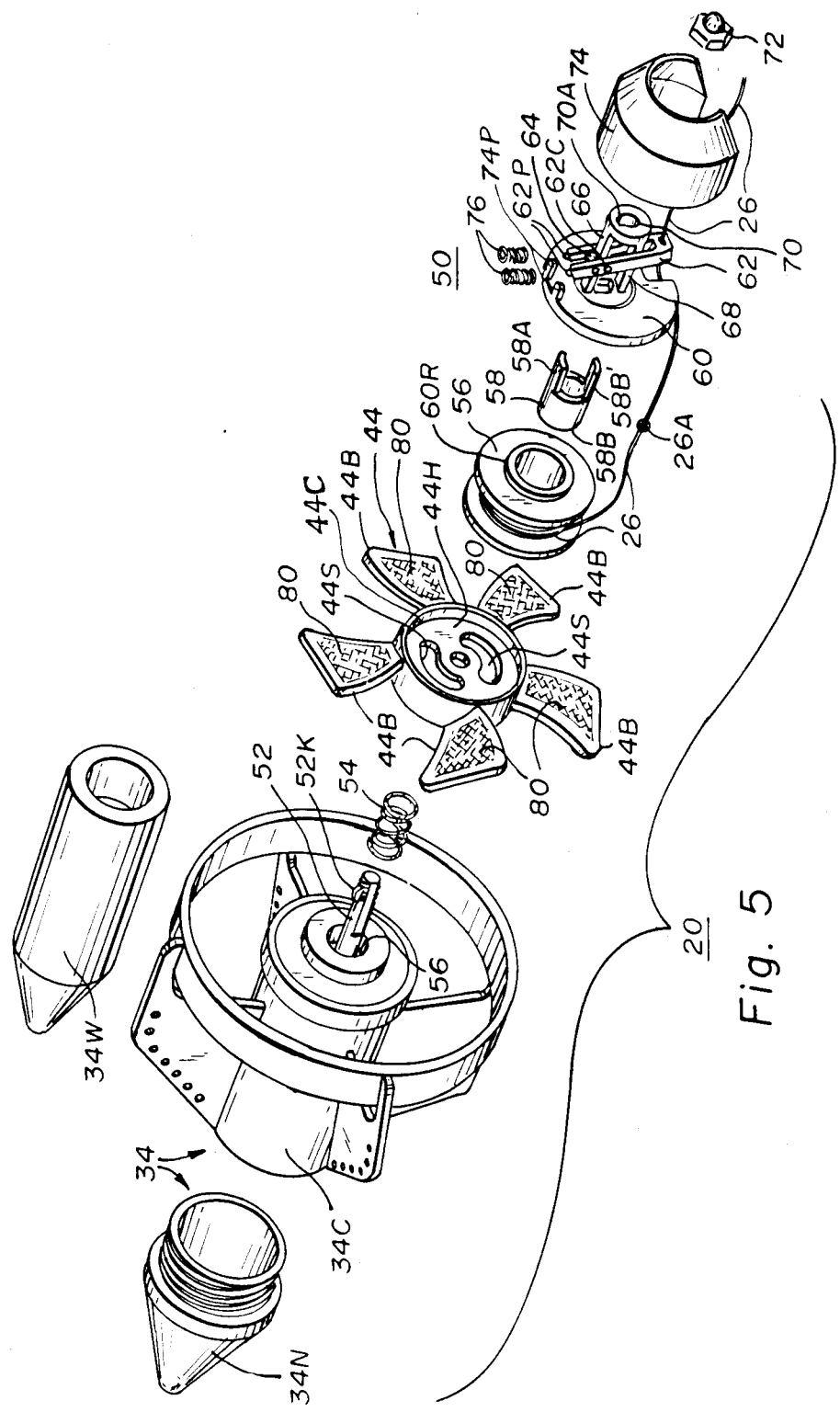

AUTOMATIC HORIZONTAL JIGGING DOWNRIGGER

FIELD OF THE INVENTION

The present invention is concerned with a new and improved underwater downrigger trolling apparatus.

BACKGROUND OF THE INVENTION

Underwater downrigger reciprocating mechanisms are known such as those described in U.S. Pat. Nos. 4,204,356 and 4,509,287. Other devices for automatically moving fishing lines are shown in U.S. Pat. Nos. 4,312,147; 3,645,030; and 3,031,790, while U.S. Pat. No. 3,623,259 describes a device for moving a fishing rod as well as its line.

Despite such prior attempts, there exists a need for a practical jigging downrigger device which will aid in attracting a fish to the lure by simulating the asymmetrical motion of the fish's natural prey, which leaves the sport of reeling in and catching the fish to the fisherman after the fish takes the bait, and is easy and versatile to use and economical to manufacture.

SUMMARY OF THE PRESENT INVENTION

The present invention provides an automatic horizontal jigging downrigger apparatus which is to be slowly trolled behind a moving boat. The apparatus has means for biasing its "swimming" position behind the boat in a manner selected by the user. This feature allows a number of these units to be trolled behind a small boat with little or no "snarling" of their lines.

An apparatus of this type constructed in accordance with the present invention includes a streamlined housing with fins projecting therefrom in such a manner as to bias the movement of the housing in one direction oblique to the direction of applied force on the housing. Further, the housing is provided with a plurality of points of attachment to a trolling line, so that the user may select which offset and where, generally, the apparatus will position itself astern of the boat when being towed.

Another feature of the invention is the provision of an underwater trolling automatic jigging apparatus whose buoyancy and mass are selectively adjustable by the user to adjust its underwater behavior.

Another feature of the invention is the provision of such a jigging apparatus which has a propeller equipped with reflective surfaces such as multi-colored prism foil, so that the apparatus itself can serve as a visual "flashing" attractant to fish. In accordance with a subsidiary feature of the invention, such propellers may be manually changeable by the user so as to easily change the type of reflective surfaces and their colors or types.

Yet another feature and advantage of the invention is the provision of a more efficient automatic jigging mechanism, wherein the outward unreeling of the jigging line is under freewheeling or free-spinning conditions, and the transfer to "take up" reeling and back to "freewheeling" is performed with a positive "snap" action, to thus avoid problems of prior mechanisms which tend to "hang up" intermediately or either in the fully retracted or fully extended positions.

The invention, together with the advantages thereof, may best be understood by reference to the following description, taken in connection with the accompanying drawings, in the several figures of which, like reference numerals identify like elements.

BRIEF DESCRIPTION OF THE DRAWINGS

FIG. 5 is an exploded view of the apparatus of FIGS. 1-4.

DETAILED DESCRIPTION OF A PREFERRED EMBODIMENT

Figure 1:
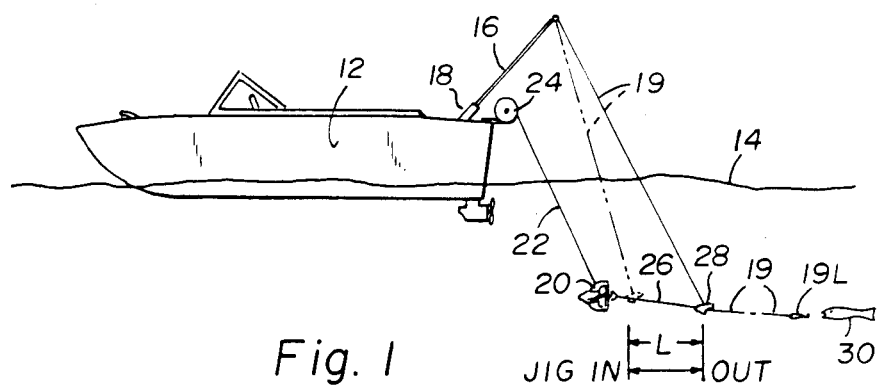
FIG. 1 is a side view of a boat in a body of water, the boat being equipped with an automatic jigging apparatus constructed and installed in accordance with the present invention. Alternative maximum and minimum fishing line positions are shown in solid and dashed lines in FIG. 1.

Referring to FIG. 1, there is depicted a small sport fishing boat 12 on a body of water 14 such as a lake or river. The boat has a conventional fishing pole 16 and reel set into a holder 18. From the top of the pole 16 is a fishing line 19 having a lure and hook 19L at its end. The rod 16, line 19, and lure 19L may be entirely conventional.

Also shown in FIG. 1 is an automatic horizontal jigging downrigger apparatus 20 constructed in accordance with the present invention. The apparatus 20 is secured to a line 22 from a winch 24 mounted at the rear of the boat 12. Such mounting and winch 24 may be entirely conventional and may be positioned at the side of the boat as well as at the rear.

In normal operation, the length of the line 22 is adjusted by a fisherman to a fixed depth and not usually changed during a period of use. This means that during a single run at a constant speed, the boat tends to move the apparatus 20 to a more-or-less fixed relationship to the boat.

The depth of operation may vary depending on the user and underwater conditions. Conventional downriggers are used at a common depth of thirty to forty feet at the Indiana shore of Lake Michigan, at between forty and eighty feet off the Michigan shore of that Lake, and as much as 200 feet in the ocean.

The apparatus 20 serves to reel in and out a fixed length L of a line 26. At the end of this line 26 is a clamp-release 28 which releasably clamps onto a portion of the fishing line 19. This clamp or release mechanism 28 is affixed by the fisherman to a point he selects on the fishing line 19 somewhere short of the lure 19L, preferably a minimum of ten to fifteen feet from the lure 19L. The release mechanism serves to hold onto the line 19 at that point during normal horizontal jigging but to release the line from the release 28 when a greater tug or pull is exerted on the line 19, such as results from a fish (such as the fish 30 in FIG. 1) striking and taking the lure 19L. After a strike and release, the rod 16 and line 19 will be used by the fisherman to take (or lose) the fish in the conventional manner.

Figure 2:
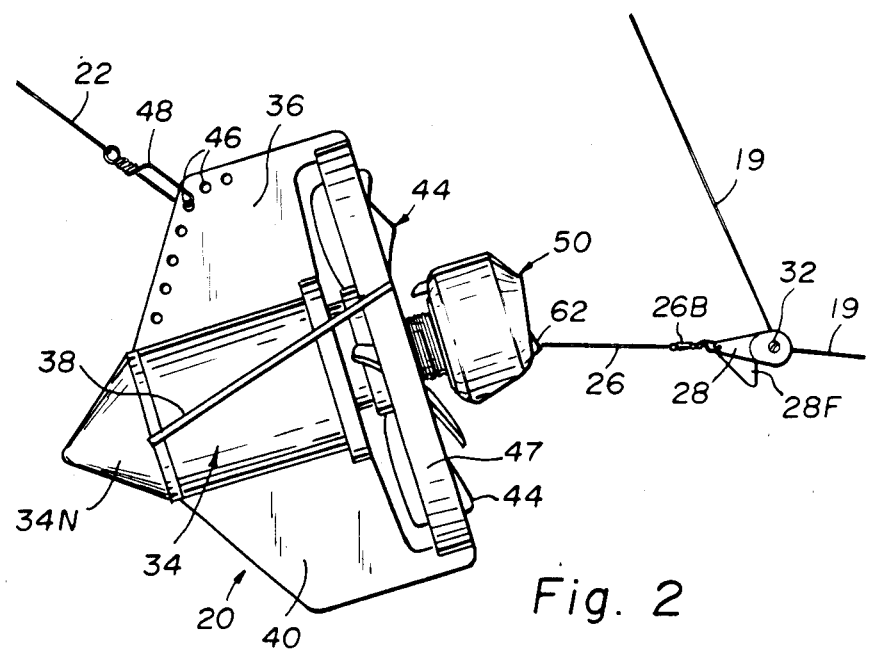
FIG. 2 is a close-up side view of the automatic jigging mechanism of the present invention and used in the installation of FIG. 1, with the lines as there attached shown fragmentally.

The release 28, as shown better in FIG. 2, may have a screw adjustment 32 for adjusting together and apart two parts which clamp on the line 19 which may be press-fitted between them. The release 28 also includes a fin 28F in accordance with one feature of the present invention. The fin 28F serves to keep the release 28 from spinning about its long axis and twisting the line 19.

Figure 3:
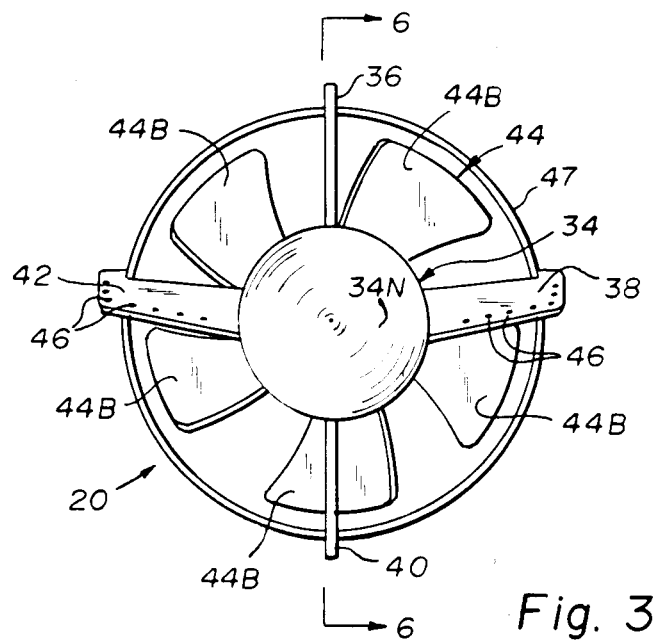
FIG. 3 is a front view of the jigging apparatus of FIGS. 1 and 2.

As shown in FIGS. 2 and 3, the apparatus 20 includes a propeller 44 and a reel mechanism 50 operated by the spinning of the propeller 44 to reel in the line 26 and to also allow it to be unreeled out of the mechanism 50.

As also shown in FIG. 2, the apparatus 20 includes a main body 34 which is a streamlined shape and has buoyancy adjusting ability, as will be explained later. As shown in FIGS. 2 and 3, the body 34 mounts four fins 36, 38, 40, and 42. As shown best in FIG. 3, the top and bottom fins 36 and 40 are in the same plane as the centerline of the body 34, while, as shown best in FIG. 2, the left and right side fins 38 and 42 are inclined at an angle to that line. The propeller's blades 44B are protected by a ring 47 which is secured to the fins 36, 38, 40, and 42.

The fins 36, 38 and 42 are each equipped with a number of holes 46 which allow the user to connect the winch line 22. This line 22 may be secured through a selected one of the holes 46 by means of a catch 48, as shown in FIG. 2.

The fins 38 and 42 serve to bias or move the body downward when the drag line 22 is connected to the fin 36, as is shown in FIG. 2.

If the catch 48 is instead placed through one of the mounting holes 46 of the fin 38, the apparatus 20 would orient itself in the water with the fin 38 pointed up, and the effect of the slanted fins 38 and 42 would be to bias and move the apparatus 20 to its left. Likewise, when the catch 48 is affixed to fin 42, it is held upward, and the apparatus is biased and moves to its right. This is illustrated in FIG. 4, where it can be appreciated that the right apparatus has its fin 42 affixed to line 22 and the center apparatus 20 has the fin 36 affixed to line 22, and the left apparatus 20 has its fin 38 so affixed.

Figure 4:
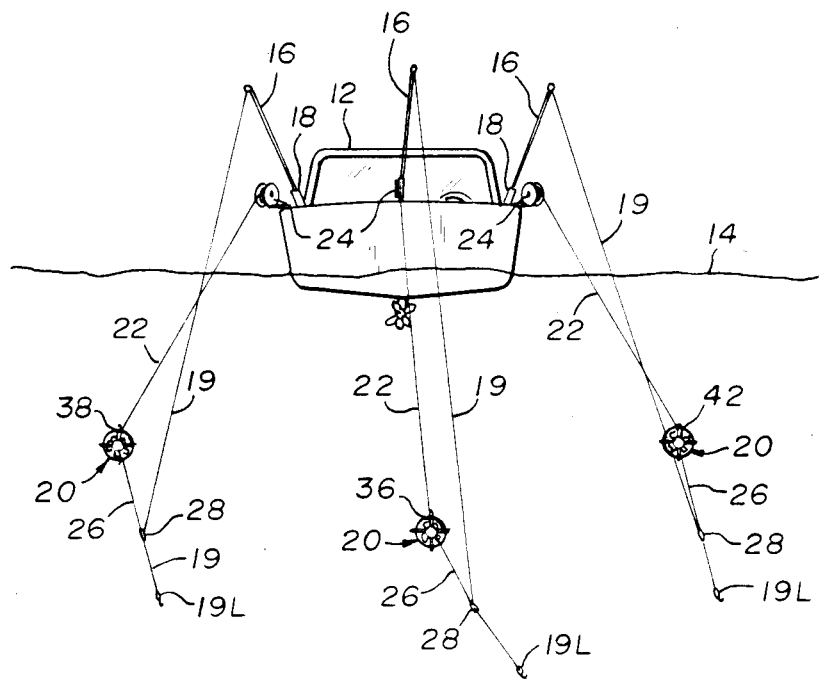
FIG. 4 is a rear view of a boat, such as that of FIG. 1, equipped with three downrigger jigger apparatus, each constructed in accordance with the present invention but each one installed differently from the others so that they may be positioned in a spaced-apart array as shown.

As can also be appreciated from FIG. 4, the depth of the apparatus 20 can be adjusted by adjusting the length of the line 22 winched out, and it can also be adjusted by changing the weight and buoyancy of the apparatus 20. The heavier the apparatus 20 is, the closer to vertical will be the line 22 between the boat and the apparatus 20.

As shown in the exploded view of FIG. 5, the body 34 preferably is hollow with a conical nose 34N which is releasably secured into the cylindrical portion 34C. By leaving the chamber 34B filled with air, the buoyancy and weight of the unit may be kept at a minimum. By filling it partly or fully with water, its mass is increased and its buoyancy decreased. And, by providing different weights within the body 34, such as, for example, sand, steel, or lead pellets, and/or other means such as the weight 34W, the apparatus' weight can be even further increased.

Changing the mass and buoyancy of the apparatus 20 affects the depth at which it will travel and manner in which the apparatus responds to changes in direction of the boat 12.

As also shown in FIG. 5, the reel mechanism 50 includes a fixed shaft 52 mounted to the rear of the cylinder portion 34C of the body 34. This shaft 52 is aligned with the centerline of the body 34 and receives all of the major components of the mechanism 50. This includes a helical spring 54, which fits within an anal groove 56 on the body.

Figure 6:
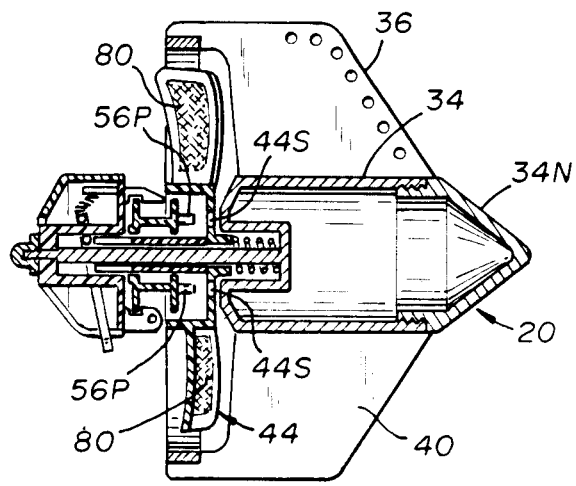
FIG. 6 is a sectional view of the apparatus of FIGS. 1-5.
Figure 7:
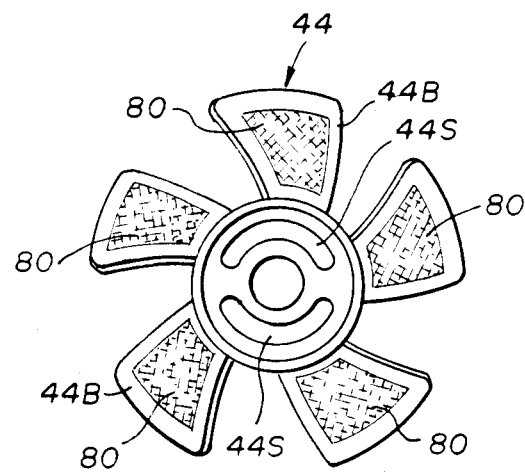
FIG. 7 is a plan view of one part, the propeller, of the apparatus of FIGS. 1-6.
Figure 8:
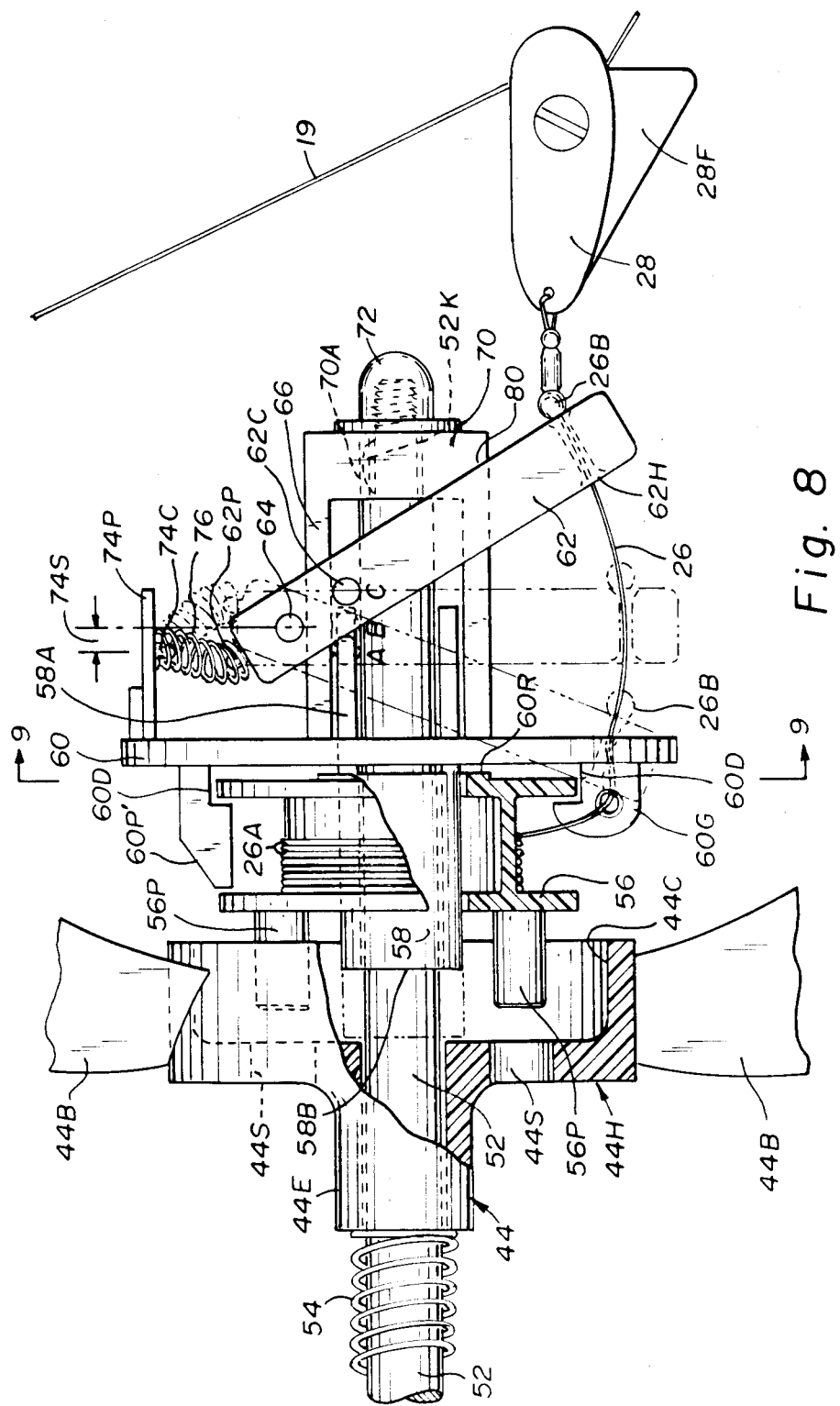
FIG. 8 is an enlarged detailed fractional sectional view of a portion of the apparatus of FIGS. 1-7 showing moved positions of certain parts in phantom outline and hidden positions and parts in dashed outline.

The spring 54 serves to press against the hub portion of the propeller 44 and mechanically bias the propeller 44 toward the rear of the apparatus 20. As the apparatus 20 is trolled through the water, the force of the water against the propeller 44 will automatically push the propeller toward the rear. The propeller 44 is so arranged that it may be axially moved forward and rearward over a short distance. The propeller 44 has a hub portion 44H which includes a circular rearward-projecting collar 44C which is sized to fit over a spool 56. As shown in FIGS. 6 and 8, the spool 56 includes a pair of projecting posts 56P which may project into cam slots 44S (FIGS. 5 & 7) formed in the hub 44H, when the propeller 44 is in its rearward position. These posts are not so received when the propeller 44 is in its forward position.

The propeller 44 is mounted so as to rotate about the shaft 52 and is essentially freewheeling so as to be turned by the current when in its forward position. When in its rearward position, the propeller when turned by the water engages and also turns the spool 56 via the slots 44S and the posts 56P (FIG. 6).

The propeller 44 is moved longitudinally along the shaft 52 by a low-friction material sleeve 58 (best shown in FIG. 5) which fits loosely about a circular portion of the shaft 52. The sleeve 58 has a circular end 58B which bears against part of the hub portion 44H of the propeller 44.

This sleeve 58 passes through the central hole of the reel 56 in a loose fit, and reel 56 is free to rotate about the sleeve 58. This sleeve is mounted so as to move axially and thereby move the propeller 44 axially. The sleeve 58 (which does not revolve relative to the housing) has a pair of projecting arms 58A and 58B' which project through a rectangular opening 60P (FIG. 9) on a non-rotating disc member 60, and arm 58A bears against a pin 62C which is part of a pivoting member 62.

The pivot member 62 is bifurcated to provide a central opening so it may straddle the shaft 52 and is pivotally mounted by pin 64 (the fulcrum point) to an outstanding bracket 66 which is secured to or formed unitarily with the disc 60 and lies over the shaft 52 when assembled (FIGS. 6, 8). The bracket 66 projects perpendicularly to disc 60. On the rear of bracket 66 is collar 70 (part of bracket 66). This collar has a keyway 70A (FIG. 5) which fits over key 52K on shaft 52. This key and collar 70 act to align the assemblage on disc 60 with fin 36. A crown nut 72 is threaded on shaft 52 to secure the entire assemblage together, as shown in FIG. 8.

A cover 74 (FIG. 5) is provided which preferably is snapped or detented to the disc member 60 and serves to protect the arm 62 mechanism.

The upper ends of the bifurcated level arm 62 have projections 62P which each receive one end of a pair of compression springs 76. The other ends of these springs 76 are received in projections 74C (FIG. 8) mounted on rearward extensions 74P which project from the disc member 60. As shown in FIG. 8, the coil springs are under compression and move between two extreme positions with the pivoting of the arm 62.

When the coil springs 76 are in either extreme position, forward or backward, the tension of the springs 76 on point 62P keeps lever arm 62 in its set position, while the line 26 is passing through a small hole at the pivoting end of the lever arm 62 until an actuator 26A or 26B comes in contact with lever arm 62, causing the lever arm 62 to move and snap into the opposite "home" position.

Note from FIG. 8 that pivot point 74C for the compression coil springs 76 is slightly forward of the center 74S, of fulcrum point 64. This causes lever arm 62 to snap forward before lever arm 62 is in a perpendicular position.

Figure 9:
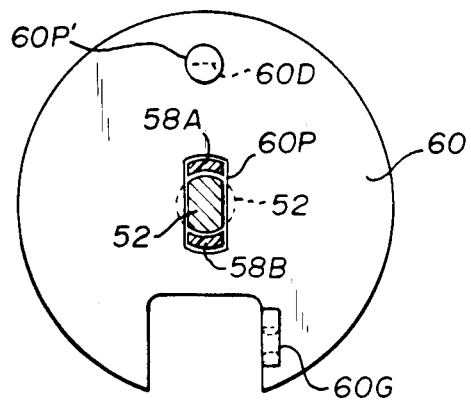
FIG. 9 is a fractional sectional view of the apparatus as seen from the line 9—9 of FIG. 8, looking in the direction of the arrows, with parts removed for clarity.

As shown in FIG. 9, a portion of the shaft 52 is preferably formed with a non-circular portion ending with a shoulder against which the disc member 60 abuts. The rectangular opening 60P is sized so as to allow the arms 58A and 58B of the sleeve 58 to freely pass through it on top and below the shaft 52. This non-circular shape of the shaft 52 and disc 60 prevents the rotation of the disc 60 as well as its cover 54 and the pivot arm 62 mechanism.

As shown best in FIG. 8, the arm member 62 has a cross pin 62C which bears against the upper arm 58A of the sleeve member 58. As also illustrated best in FIG. 8, this pin 62C serves to axially slide the sleeve 58 forward (and thus the propeller 44) as the lever arm 62 pivots on the fulcrum point 64 between two stopped positions, a rear position shown in solid lines (pin 62C at position C), and a forward position shown in dashed lines (pin 62C at position A) in FIG. 8. The springs 76 serve to bias the member 62 into these extreme positions and "snap" it to those home positions. (The actual positions are limited by the rear stop 80, which projects from the bracket 66 and the rear wall of the disc 60 which serves as the forward stop.)

As shown in FIGS. 5 and 8, the bottom of the pivot arm 62 is provided with hole 62H through which the line 26 freely travels and moves. This line 26 is equipped with an actuator bead 26A securely affixed at one point along its length between the lever arm 62 and the end of the line 26 attached to the spool or reel 56. The bead 26A is sized not to fit through the opening or hole 62H and serves to instead move or pivot the lever arm 62 from the dashed position to the solid position in FIG. 8.

The line 26 includes a second actuator 26B at (or near) its end attached to the release 28. [Of course, the release mechanism 28 may also serve as the actuator if attached and constructed to do so.] This actuator 26B is also sized not to pass through the hole 62H but to instead pivot lever arm 62 from the solid position of FIG. 8 to its dashed line position, as indicated in that Figure.

It will be appreciated that when the lever arm 62 is moved from the solid line, rearward position to the dashed line forward position of FIG. 8, then the sleeve 58 and its forward-facing surface 58B is moved axially forward. This moves the propeller forward and disengages the studs 56P of the reel 56 from the propeller slots 44S. (For clarity of depiction, the propeller is shown in its forward position in solid lines in FIG. 8—that is, in the position it would be in when the sleeve is in its forward position which is shown in phantom lines in FIG. 8.)

The reel 56 is prevented from travelling longitudinally with the sleeve 58 and propeller 44 by means of a pair of restraints, one at the top and one at the bottom of the disc 60. The top restraint is formed by member 60G (FIG. 8) (which also serves as a lead for the line 26). This member 60G receives the rearward wall of the reel 56 adjacent its wall 60D. The second restraint is formed by a member 60P' which projects forward from the top of the disc 60 and has an undercut 60D which also receives the rearward wall of the reel 56. As shown, this is a loose fit, and the reel 56 is provided with a raised ridge 60R so as to provide for a minimum of frictional contact with the disc 60 and restraints 60G and 60D.

When the apparatus 20 is rigged as shown in FIGS. 1-4 and the boat 12 is moving forward, there results a drag or pull on the line 26 because of friction between the water and the lure 19L, line 19, release 28, and any portion of the line 26 which is not reeled in. With the reel 56 disengaged from the propeller, reel 56 is free to rotate independently, and this drag on the above-mentioned lines and parts will pull on the line 26 and cause it to reel out. The line 26 will continue to unwind and move off of the free-wheeling reel 56 through the hole 62H of the lever arm 62 until the actuator 26A strikes the lever arm 62. This causes the lever arm 62 to pivot rearward, which moves the pin 62C rearward and allows the sleeve 58 to move rearward, propelled by the spring bias exerted by the spring 54 through the propeller hub 44. The spring 54 and the force of the water also, of course, move the propeller hub 44H axially rearward so that the studs 56P of the reel 56 enter the slots 44S and are engaged by the edges of those slots. This means that the reel 56 will now turn with the propeller 44.

In this configuration, with the boat 12 drawing the apparatus 20 through the water, the propeller will spin the reel 56 and reel in the line 26 until the actuator 26B contacts the rearward-positioned lever arm 62 and pivots it forward on the fulcrum point 64, disengaging the propeller from the reel. The drag on the lines, release, and lure are then again free to unreel the line 26 until the other actuator 26A again strikes the arm 62 and repeats the process.

This process will be repeated indefinitely, moving the line 19 and lure 19L in and out as shown in FIG. 1, so long as the apparatus 20 is drawn through the water, until a fish strikes the lure. Note should be taken that the motion in and out of the lure is not symmetrical, even under conditions of steady speed and direction of the boat 12 and apparatus 20. That is, while the line 26 is drawn in, more-or-less uniformly, by the direct drive of the reel 56 by the propeller 44, the reeling out is not uniform, since it depends on the drag in the lines, which increases as more line 26 is fed out, and inertia of the reversed direction of travel of the reel 56. This is believed to provide a more natural motion to the lure and/or lures, some of which could be buoyant and tend to float up, or non-buoyant lures which, of course, would tend to sink. This action should attract and encourage fish to strike at the lures.

In accordance with a secondary feature of the present invention, further fish attraction is provided by the provision of multi-faceted prism reflectors 80 affixed to the surfaces of the individual propeller blades 44B, as shown best in FIG. 5. These reflectors may be of the self-adhesive type, such as are currently commercially available under the trademark "Diffractor Lite", distributed by Coburn Corp., of 1650 Corporate Rd. West, Lakewood, N.J., 08701, U.S.A. The tapes distributed by Witchcraft Tape Products, Box 937, Coloma, Mich., 49038, under the brand name Witchstix, Model #5SL, could also be used. This provides a fish scale-like flashing attractant which may simulate the appearance of a school of fish and tends to attract the attention of predatory fish to the general area of the apparatus 20, so that they may also be attracted to the moving lure 19L which trails behind the apparatus 20.

As mentioned above, when the lure is taken by a fish, the force exerted by the fish on the line 19 releases the line from the release 28, and it is then up to the fisherman to take up the rod 16 and try to land the fish. This is a major advantage of the apparatus 20, since it leaves the sport of fishing to sportsmen and is not a mechanical fisherman at all.

After the fish is taken (or lost) off the hook, the sportsman may easily reset the line 19 with the release 28, without the necessity of pulling the apparatus 20 into the boat. This can be done by operating the winch 24 to raise the apparatus 20 within reach and reaching down and grasping the release 28 which can be brought up toward or even into the boat 62 without the necessity of bringing in the apparatus 20. With the line 19 reattached, the apparatus 20 may be wound out and lowered to the desired depth.

It also should be noted that the apparatus 20 is versatile and allows the sportsman to place his lure deep or shallow in the water 14 and to, by varying the mass (as explained above) as well as the orientation or bias (dive down, move left, or move right), change the dynamic behavior of the apparatus 20 and thus of the lure 19L, and to use more lines and lures with less risk of tangling them together.

Figure 10:
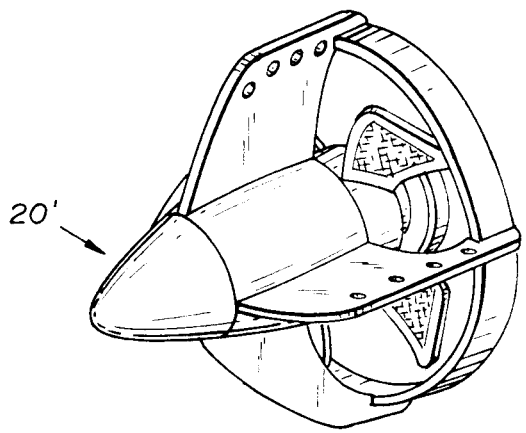
FIG. 10 is a perspective view of an alternative construction of a downrigger device of the present invention.

As mentioned above, a prototype of the invention has been built and tested and shown to work well. For purposes of definiteness, the following details are provided as to this prototype, which generally was constructed as shown in FIGS. 1–9. These are put forth for purposes of illustration and not for purposes of limitation. Of course, those skilled in this art will recognize that many variations can be employed in practicing this invention, and, indeed, the present inventor may well decide in the future to vary from the disclosed preferred embodiment and the prototype, and, indeed, FIG. 10 is an illustration of one such modification in which the body 34' is shortened and more streamlined, and the entire body, fins 36', 38', 40', 42', and ring 47' are preferably unitarily formed out of a high-impact plastic.

With this understanding, the tested prototype was constructed with a body, fins, and ring of steel, and the apparatus had an overall size of about 8½ inches in length and about 7 inches in diameter and weighed about 8 pounds. The fins were of 1/16-inch-thick sheet steel. The propeller was a commercially-available propeller, 6½-inch Fire Blade Propeller cooling fan for electric motors, made by Thorgren Mgr., of Valparaiso, Ind., of nylon, which was modified by providing the hub slots, hub extension, and prismatic blade surfaces. The reel 56 was part of a Zebco reel, and other parts were made from stock pieces, with the cover 74 being a modified fishing reel cover. The shaft 52 was about 3¾ inches long, with each end threaded. It was made of a ⅜-inch-diameter bar, ground down to provide ¼-inch wide flat surfaces on either side at its rear end, for a distance of 1½ inches, and to provide a shoulder for receiving the disc member 60, and with its rearward end cut down to a ¼-inch diameter and threaded to receive the nut 72.

The line 26 was an 8–10 pound test fishing line, and actuator 26A was formed by a holed bead held in place by a knot in the line 26 wedged within the hole.

Of course, in mass production, specially-made parts would be preferred.

It should be noted that the mechanism is easily disassembled and reassembled in the field. That is, by removing the cover 74 and the nut 72, the mechanism 50 can be moved off of the shaft 52 (much as shown in the light side of FIG. 5) and the propeller 44 removed. Preferably, a number of spare propellers are provided to the user, each of which has a different reflective surface 80 (such prismatic surfaces 80 come in a large number of colors and patterns) to allow the user to select "flashing" attractants as he or she prefers for the type of fish he or she wishes to attract and the weather conditions (cloudy, sunny, etc.).

Thus, it should now be apparent that the versatile apparatus of the present invention provides a new dimension to fishing by allowing the fisherman to vary its weight and buoyancy, its flashing characteristics, its depth of operation, the length of horizontal jigging, and the distance between the lure and the release. This, plus the fact that once the lure is "taken", the fisherman can experience the sport of landing the fish in the conventional manner, means that fishing as an individualistic sport has been extended and broadened.

While two particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

I claim:

1. An underwater horizontal jigging downrigger for being towed by a tow line from a fishing boat for use in trolling for fish with a fishing line having a lure comprising:

a streamlined housing having provision for being attached to a tow line for being towed behind a boat;

a propeller mounted to said housing for normally being turned as the housing is towed through the water;

a jigging line having a relase clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unreeled by the flow of water against that line and any fishing line and lure attached thereto; and fins mounted on said housing and being so arranged in said housing that, as the downrigger is towed through the water, the fins bias the movement of the downrigger in one direction perpendicular to the direction of travel;

wherein said downrigger is provided with a plurality of tow line attaching means so that the user may select different orientation and determining the particular direction of perpendicular bias so that the towed downrigger may be made to be towed directly behind or to the left or right of the boat; and wherein the housing defines a chamber which may be selectively filled with air or more massive material to change the buoyancy, mass and underwater movement characteristics of the downrigger.

2. An underwater horizontal jigging downrigger for being towed by a tow line from a fishing boat for use in trolling for fish with a fishing line having a lure comprising:

a streamlined housing having provision for being attached to a tow line for being towed behind a boat;

a propeller mounted to said housing for normally being turned as the housing is towed through the water;

a jigging line having a rlease clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unreeled by the flow of water against that line and any fishing line and lure attached thereto; and fins mounted on said housing and being so arranged in said housing that, as the downrigger is towed through the water, the fins bias the movement of the downrigger in one direction perpendicular to the direction of travel (such as downward or to the left or right);

wherein said downrigger is provided with a plurality of tow line attaching means so that the user may selected different orientation and determining the particular direction of perpendicular bias so that the towed downrigger may be made to be towed directly behind or to the left or right of the boat; and wherein said coupling means includes an actuator element which is moved between coupling and decoupling positions in response to the jigging line reaching extended and reeled-in positions and means for mechanically biasing said acutator element toward said coupling and decoupling positions.

3. An underwater horizontal jigging downrigger for being towed by a tow line from a fishing boat for use in trolling for fish with a fishing line having a lure comprising:

a streamlined housing having provision for being attached to a tow line for being towed behind a boat;

a propeller mounted to said housing for normally being turned as the housing is towel through the water;

a jigging line having a release clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unreeled by the flow of water against that line and any fishing line and lure attached thereto; and fins mounted on said housing and being so arranged in said housing that, as the downrigger is towed through the water, the fins bias the movement of the downrigger in one direction perpendicular to the direction of travel (such as downward or to the left or right);

wherein said means for coupling includes:

means defining a common axis of rotation for both said reel and said propeller, with said propeller being mounted for not only rotation but also axial displacement, said reel having means for engaging said propeller so as to be driven thereby when said propeller is axially displaced to one axial position but not engaging said propeller when said propeller is axially displaced to a second axial position;

an axial displacement member for moving said propeller between said displaced axial positions;

a positive snap action lever arm device having a fulcrum or pivot point secured to said housing and a free end which defines a small hole through which said jigging line feeds, said arm being put in motion by a first actuator attached to a point on said jigging line between said reel and said hole, or by a second actuator attached to a point along said jigging line distant from said first actuator and on the other side of said hole, the movement of either of said actuators against said arm device at the hole serving to cause the said arm device to rotate or pivot at said fulcrum; and means mechanically biasing said lever arm device and axial movement member so that they are snapped between engaging and disengaging positions in response to said actuators contacting said lever arem device.

4. The downrigger of claim 3, wherein said means for engaging is a pair of projecting studs on one of said propelier or reel and a pair of receiving slots on the other for receiving and engaging said studs.

5. The downrigger of claim 4, wherein said propeller is mounted on a shaft and said axial movement member is a sleeve mounted on said shaft, said reel is mounted to rotate about said sleeve, said arm device contacts a projection from said sleeve, and said biasing means is a compression spring mounted between said arm and said housing.

6. An underwater horizontal jigging downrigger for being towed by a tow line from a fishing boat for use in trolling for fish with a fishing line having a lure comprising:

a streamlined housing having provision for being attached to a tow line for being towed behind a boat;

a propeller mounted to said housing for normally being turned as the housing is towed through the water;

a jigging line having a release clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unreeled by the flow of water against that line and any fishing line and lure attached thereto, said means for decoupling and coupling including a mechanically biased member which is mechanically biased toward either of two stable positions, the movement to one of which positions causes the coupling of said reel and said propeller, and the movement to the other of said positions results in the decoupling of said reel and said propeller, said jigging line inlcuding means for actuating the movement of said member between said coupling and decoupling positions; and wherein the housing defines a chamber which may be selectively filled with air or more massive material to change the buoyancy, mass and underwater movement characteristics of the downrigger.

7. An underwater horizontal jigging downrigger for being towed by a tow line from a fishing boat for use in trolling for fish with a fishing line having a lure comprising:

a streamlined housing having provision for being attached to a tow line for being towed behind a boat;

a propeller mounted to said housing for normally being turned as the housing is towed through the water;

a jigging line having a release clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unreeled by the flow of water against that line and any fishing line and lure attached thereto, said means for decoupling and coupling including a mechanically biased member which is mechanically biased toward either of two stable positions, the movement to one of which positions causes the coupling of said reel and said propeller, and the movement to the other of said positions results in the decoupling of said reel and said propeller, said jigging line including means for actuating the movement of said member between said coupling and decoupling positions; and wherein said member of said coupling and decoupling means is moved between coupling and decoupling positions in response to the jigging line reaching extended and reeled-in positions and said coupling and decoupling means further includes means for mechanically biasing said member toward said coupling and decoupling positions.

8. An underwater horizontal jigging downrigger for being towed by a tow line from a fishing boat for use in trolling for fish with a fishing line having a lure comprising:

a streamline housing having provision for being attached to a tow line for being towed behind a boat;

a propeller mounted to said housing for normally being turned as the housing is towed through the water;

a jigging line having a release clamp for receiving a portion of a fishing line and holding that portion against normal forces encountered in trolling but releasing that line in response to higher forces such as result from a fish taking the line's lure;

a reel mounted on said housing for reeling in and allowing the reeling out of said jigging line;

means for coupling said reel to said propeller so that the propeller drives the reel so as to reel in said jigging line and for decoupling said reel from said propeller so that the reel may "freewheel" and allow said jigging line to be unrealed by the flow of water attached thereto; and said housing defines a chamber which may be selectively filled with air or more massive material to change the buoyancy, mass and underwater movement characteristics of the downrigger.

* * * * *

UNITED STATES PATENT AND TRADEMARK OFFICE
CERTIFICATE OF CORRECTION

PATENT NO. : 4,798,021

DATED : January 17, 1989

INVENTOR(S) : Louis F. Miklos

It is certified that error appears in the above-identified patent and that said Letters Patent is hereby corrected as shown below:

Column 8, Line 52: delete "relase" and substitute --release--

Column 9, Line 2: delete "the direction of travel;" and substitute --the direction of travel (such as downward or to the left or right);--

Column 9, Line 24: delete "rlease" and substitute --release--

Column 9, Line 55: delete "acutator" and substitute --actuator--

Column 9, Line 65: delete "towel" and substitute --towed--

Column 10, Line 47: delete "arem" and substitute --arm--

Column 10, Line 50: delete "propelier" and substitute --propeller--

Column 11, Line 22: delete "inlcuding" and substitute --including--

Column 12, Line 26: delete "streamline" and substitute --streamlined--

UNITED STATES PATENT AND TRADEMARK OFFICE
CERTIFICATE OF CORRECTION

PATENT NO. : 4,798,021

DATED : January 17, 1989

INVENTOR(S) : Louis F. Miklos

It is certified that error appears in the above-identified patent and that said Letters Patent is hereby corrected as shown below:

Column 12, Lines 42 and 43: delete "unrealed by the flow of water attached thereto; and" and substitute --unreeled by the flow of water against that line and any fishing line and lure attached thereto; and--

Signed and Sealed this

Twenty-fifth Day of July, 1989

*Attest:*

DONALD J. QUIGG

*Attesting Officer*    *Commissioner of Patents and Trademarks*